(12) United States Patent
Nate

(10) Patent No.: US 9,419,540 B2
(45) Date of Patent: Aug. 16, 2016

(54) SWITCHING POWER SUPPLY CIRCUIT

(71) Applicant: Rohm Co., Ltd., Kyoto (JP)

(72) Inventor: Satoru Nate, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/883,780

(22) Filed: Oct. 15, 2015

(65) Prior Publication Data

US 2016/0111970 A1    Apr. 21, 2016

(30) Foreign Application Priority Data

Oct. 16, 2014    (JP) .................................. 2014-211490

(51) Int. Cl.
   - H02M 1/12    (2006.01)
   - H02M 1/14    (2006.01)
   - H02M 7/217    (2006.01)
   - H05B 37/02    (2006.01)
   - H05B 33/08    (2006.01)

(52) U.S. Cl.
   CPC ............... *H02M 7/217* (2013.01); *H05B 33/08* (2013.01); *H05B 37/02* (2013.01)

(58) Field of Classification Search
   CPC ....... H02M 1/4225; H02M 1/44; H02M 1/15; H02M 1/4208; H02M 7/5383; Y02B 70/126
   USPC ............ 323/207, 222–224, 282–286; 363/89, 363/44–46, 126; 315/200, 209 R, 291, 294, 315/297, 77, 307, 200 R
   See application file for complete search history.

(56) References Cited

U.S. PATENT DOCUMENTS

| | | | | |
|---|---|---|---|---|
| 2012/0169240 | A1* | 7/2012 | Macfarlane | H02M 1/4225 315/152 |
| 2012/0249001 | A1* | 10/2012 | Okubo | H05B 33/0851 315/200 R |
| 2012/0262954 | A1* | 10/2012 | Duvnjak | H02M 1/4258 363/21.02 |
| 2013/0301324 | A1* | 11/2013 | Chiang | H02M 1/4225 363/126 |

FOREIGN PATENT DOCUMENTS

JP    2012-182967    9/2012

* cited by examiner

*Primary Examiner* — Alexander H Taningco
*Assistant Examiner* — Renan Luque
(74) *Attorney, Agent, or Firm* — Fish & Richardson P.C.

(57) ABSTRACT

Provided is a switching power supply circuit including an output transistor arranged to be turned on and off to generate a desired output voltage from a pulsating voltage obtained by rectifying an AC input voltage, an oscillator arranged to generate an ON signal at a switching frequency varying periodically in synchronization with the AC input voltage or the pulsating voltage, a controller arranged to generate an OFF signal so that the output voltage is adjusted to a target value while a power factor becomes close to one, a logic circuit arranged to generate a switch control signal in accordance with the ON signal and the OFF signal, and a driver arranged to turn on and off the output transistor in accordance with the switch control signal.

9 Claims, 12 Drawing Sheets

SWITCHING POWER SUPPLY CIRCUIT

CROSS-REFERENCE TO RELATED APPLICATIONS

This application is based on the following Japanese Patent Application, the contents of which are hereby incorporated by reference:
(1) Patent Application No.: 2014-211490 (the filing date: Oct. 16, 2014)

BACKGROUND OF THE INVENTION

1. Field of the Invention

The present invention relates to a switching power supply circuit.

2. Description of Related Art

There is a conventional switching power supply circuit having a power factor improvement function (so-called power factor correction (PFC) function) in which a phase of an AC input voltage and a phase of an AC input current are adjusted so that the power factor becomes close to one. In addition, there is a conventional switching power supply circuit having a frequency hopping function (frequency spectrum spreading function) in which the switching frequency is periodically changed so that low electro-magnetic interference (EMI) is realized.

As an example of the conventional technique related to be above description, there is JP-A-2012-182967 filed by this applicant.

However, if both the power factor improvement function and the frequency hopping function are independently mounted in the conventional switching power supply circuit, even order harmonic characteristics may be deteriorated.

SUMMARY OF THE INVENTION

The invention disclosed in this specification is made in view of the above-mentioned problem found by the inventor of this invention. It is an object of the present invention to provide a switching power supply circuit that can achieve both the power factor improvement function and the frequency hopping function without deteriorating harmonic characteristics.

In order to achieve the above-mentioned object, the switching power supply circuit disclosed in this specification includes an output transistor arranged to be turned on and off for generating a desired output voltage from a pulsating voltage obtained by rectifying an AC input voltage, an oscillator arranged to generate an ON signal at a switching frequency varying periodically in synchronization with the AC input voltage or the pulsating voltage, a controller arranged to generate an OFF signal so that the output voltage is adjusted to a target value while a power factor becomes close to one, a logic circuit arranged to generate a switch control signal in accordance with the ON signal and the OFF signal, and a driver arranged to turn on and off the output transistor in accordance with the switch control signal.

Note that other features, elements, steps, advantages, and characteristics of the present invention will become more apparent from the description of embodiments given below and the attached drawings.

DETAILED DESCRIPTION OF THE PREFERRED EMBODIMENTS

<LED Lighting Equipment>

Figure 1:
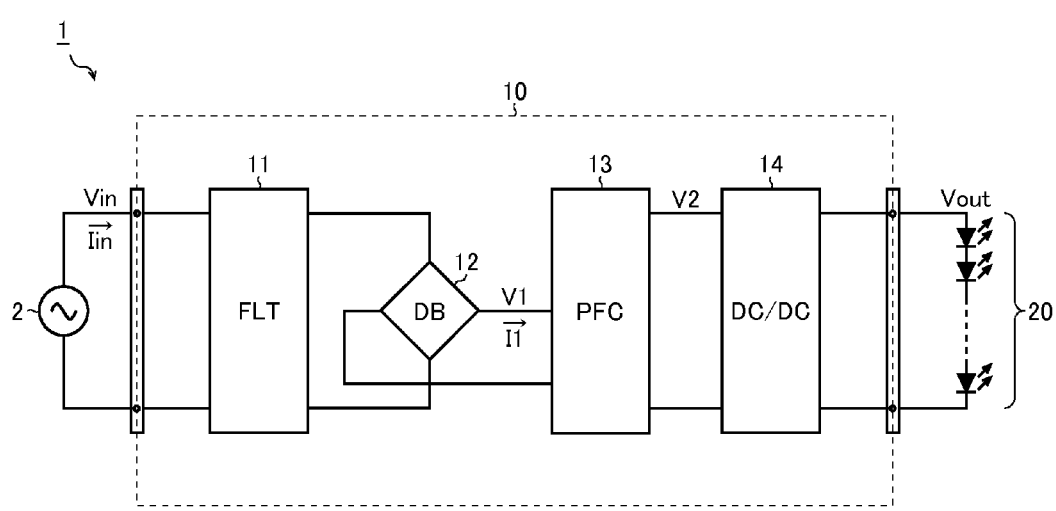
FIG. 1 is a block diagram showing an overall structure example of light emitting diode (LED) lighting equipment.

FIG. 1 is a block diagram showing an overall structure example of LED lighting equipment 1. The LED lighting equipment 1 of this structure example includes an LED power supply module 10 and an LED module 20.

The LED module 20 is a light source of the LED lighting equipment 1, which emits light of a daylight color (having a color temperature of 6700K), a daylight white color (having a color temperature of 5000K), a white color (having a color temperature of 4200K), a warm white color (having a color temperature of 3500K), or a bulb color (color temperature 3000K), for example. The LED module 20 includes a single LED element or a plurality of LED elements connected in series or in parallel, as a light emitting element that emits light by power supplied from the LED power supply module 10. However, the light emitting element is not limited to the LED element but may be an organic electro-luminescence (EL) element or the like.

The LED power supply module 10 converts an AC input voltage Vin from a commercial AC power supply 2 into a DC output voltage Vout, and supplies the DC output voltage Vout to the LED module 20 as a load. The LED power supply module 10 includes a filter circuit 11, a rectifier circuit 12, a switching power supply circuit 13, and a DC/DC converter circuit 14 mounted on the same printed wiring substrate.

The filter circuit 11 is disposed in a pre-stage of the switching power supply circuit 13 (in a pre-stage of the rectifier circuit 12 in this structure example) so as to remove noise components and surge components superimposed on the AC input voltage Vin. The filter circuit 11 includes an X capacitor, a common mode filter, a normal mode filter, a fuse element, and the like.

The rectifier circuit 12 generates a pulsating voltage V1 by full wave rectifying or half wave rectifying of the AC input voltage Vin supplied via the filter circuit 11. The rectifier circuit 12 includes a diode bridge, a smoothing capacitor, and the like.

The switching power supply circuit 13 generates a desired stepped-up voltage V2 from the pulsating voltage V1. If the pulsating voltage V1 is regarded as an AC voltage, the switching power supply circuit 13 can be regarded as an AC/DC converter circuit. Note that the switching power supply circuit 13 has both a power factor improvement function of adjusting a phase of the AC input voltage Vin and a phase of an AC input current Iin so that the power factor becomes close to one and a frequency hopping function (frequency spectrum spreading function) of periodically changing a switching frequency Fsw so as to realize low EMI. A structure and an operation of the switching power supply circuit 13 will be described later in detail.

The DC/DC converter circuit 14 is disposed in a post-stage of the switching power supply circuit 13 and generates the desired DC output voltage Vout from the stepped-up voltage V2 so as to supply the DC output voltage Vout to the LED module 20. Further, this structure example adopts a two-converter system in which the switching power supply circuit (AC/DC converter circuit having the power factor improvement function) 13 and the DC/DC converter circuit 14 are independently disposed, but it is possible to adopt a single converter system in which the two circuits are combined.

<Switching Power Supply Circuit (PFC Circuit)>

Figure 2:
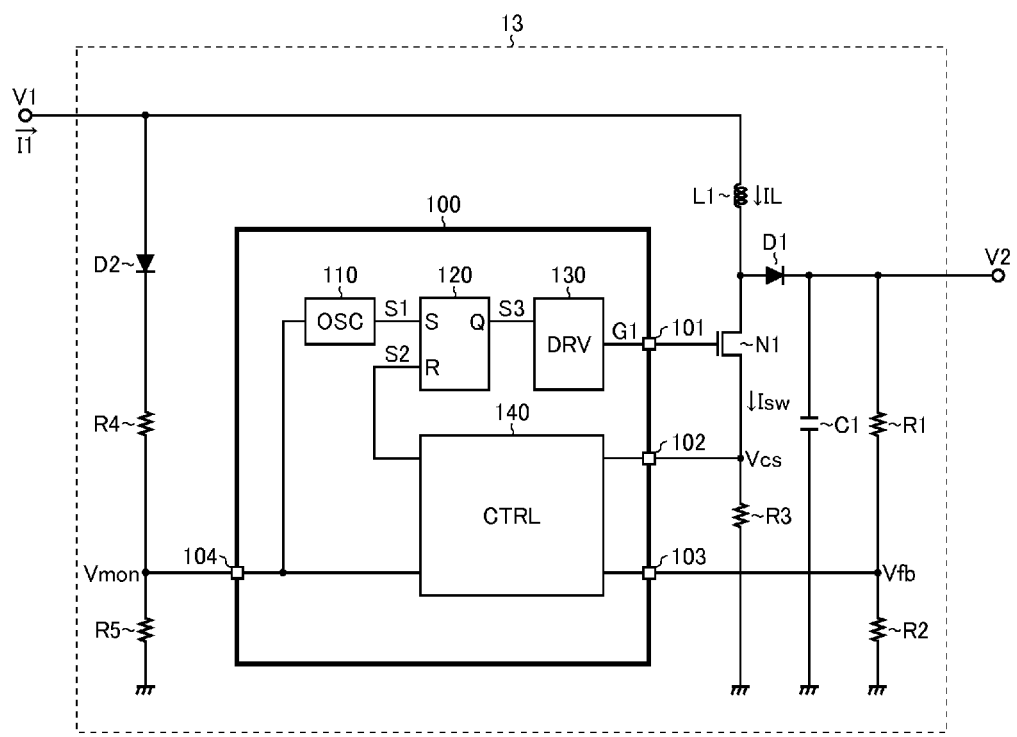
FIG. 2 is a circuit block diagram showing a structure example of a switching power supply circuit.

FIG. 2 is a circuit block diagram showing a structure example of the switching power supply circuit 13. The switching power supply circuit 13 of this structure example includes a switching control IC 100, and various discrete parts connected externally to the switching control IC 100 (an output transistor N1, resistors R1 to R5, diodes D1 and D2, a capacitor C1, and a coil L1).

The switching control IC 100 is a controlling unit of the switching power supply circuit 13. The switching control IC 100 has external terminals 101 to 104 as means arranged to establish electric connection to the outside.

A first terminal of the coil L1 is connected to an input terminal of the pulsating voltage V1. A second terminal of the coil L1 is connected to a drain of the output transistor N1 and an anode of the diode D1. A cathode of the diode D1 is connected to an output terminal of the stepped-up voltage V2. A gate of the output transistor N1 is connected to the external terminal 101 (output terminal of a gate signal G1). A source of the output transistor N1 is connected to a ground terminal via the resistor R3. The resistor R3 functions as a sense resistor that performs current-to-voltage conversion of switch current Isw flowing when the output transistor N1 is on so as to generate a sense voltage Vcs (=Isw×R3). A connection node between the output transistor N1 and the resistor R3 is connected to the external terminal 102 as an output terminal of the sense voltage Vcs. The capacitor C1 is connected between the output terminal of the stepped-up voltage V2 and the ground terminal. The resistors R1 and R2 are connected in series between the output terminal of the stepped-up voltage V2 and the ground terminal. The resistors R1 and R2 function as a feedback voltage generation circuit of generating a feedback voltage Vfb corresponding to the stepped-up voltage V2. A connection node between the resistor R1 and the resistor R2 is connected to the external terminal 103 as an output terminal of the feedback voltage Vfb.

The discrete parts (the output transistor N1, the resistors R1 to R3, the capacitor C1, and the coil L1) connected as described above function as a step-up type switching output stage of stepping up the pulsating voltage V1 to generate the desired stepped-up voltage V2 by turning on and off the output transistor N1 so as to drive the coil L1 as an energy storing element.

However, the switching output stage is not limited to the step-up type but can be a step-down type or a step-up/down type. In addition, the diode D1 may be replaced by a synchronous rectifier transistor. In addition, the switching output stage may be changed from a non-insulation type to an insulation type.

An anode of the diode D2 is connected to an input terminal of the pulsating voltage V1. A cathode of the diode D2 is connected to a first terminal of the resistor R4. A second terminal of the resistor R4 and a first terminal of the resistor R5 are both connected to the external terminal 104. A second terminal of the resistor R5 is connected to the ground terminal. The discrete parts (the diode D2 and the resistors R4 and R5) connected as described above function as a monitor voltage generation circuit that generates a monitor voltage Vmon by dividing the pulsating voltage V1. Note that the monitor voltage Vmon may be generated by dividing the AC input voltage Vin.

<Switching Control IC>

Next, with reference to FIG. 2, a structure and an operation of the switching control IC are described. The switching control IC 100 of this structure example is a semiconductor integrated circuit device to be a control unit of the switching power supply circuit 13, and includes an oscillator 110, an RS flip-flop 120, a gate driver 130, and a controller 140. Note that the switch control IC 100 may include, in addition to the circuit block described above, an abnormality protection circuit and the like in an appropriate manner.

The oscillator 110 generates an ON signal S1 at the switching frequency Fsw varying periodically in synchronization with the monitor voltage Vmon (namely, with the AC input voltage Vin and the pulsating voltage V1). A structure and an operation of the oscillator 110 will be described later in detail.

The RS flip-flop 120 is a logic circuit that generates a switch control signal S3 (pulse width modulation (PWM) signal) in accordance with the ON signal S1 and an OFF signal S2. Specifically, the RS flip-flop 120 sets the switch control signal S3 to high level at a rising edge of the ON signal S1 and resets the switch control signal S3 to low level at a rising edge of the OFF signal S2.

The gate driver 130 generates the gate signal G1 in accordance with the switch control signal S3 so as to turn on and off the output transistor N1. More specifically, the gate driver 130 sets the gate signal G1 to high level so as to turn on the output transistor N1 when the switch control signal S3 is high level, and resets the gate signal G1 to low level so as to turn off the output transistor N1 when the switch control signal S3 is low level.

The controller 140 generates the OFF signal S2 so that the stepped-up voltage V2 is adjusted to a target value while the power factor becomes close to one. More specifically, the controller 140 performs power factor improvement control in accordance with the monitor voltage Vmon and the sense voltage Vcs, while performing an output feedback control in accordance with the feedback voltage Vfb, so as to perform switching drive of the output transistor N1. Note that a method of the power factor improvement control by the controller 140 can be achieved by applying known techniques, and hence detailed description thereof is omitted here.

<Step-up Operation>

Next, a fundamental operation (step-up operation) of the switching power supply circuit 13 is described. The output transistor N1 is turned on and off so as to generate the desired stepped-up voltage V2 from the pulsating voltage V1. When the output transistor N1 is turned on, coil current IL flows in the coil L1 toward the ground terminal via the output transistor N1 so that electric energy thereof is stored. In this case, because the drain voltage (switch voltage Vsw) of the output transistor N1 is dropped to substantially a ground voltage GND via the output transistor N1, the diode D1 becomes a reverse bias state so that reverse current does not flow from the capacitor C1 to the output transistor N1. On the other hand, when the output transistor N1 is turned off, the electric energy stored in the coil L1 is discharged as a reverse voltage. In this case, because the diode D1 becomes in a forward bias state, the coil current IL flowing through the diode D1 flows from the output terminal of the stepped-up voltage V2 to the DC/DC converter circuit 14 in a post-stage and flows into the ground terminal via the capacitor C1 so as to charge the capacitor C1. The above-mentioned operation is repeated, and hence the switching power supply circuit 13 generates the stepped-up voltage V2 from the pulsating voltage V1.

<Oscillator>

Figure 3:
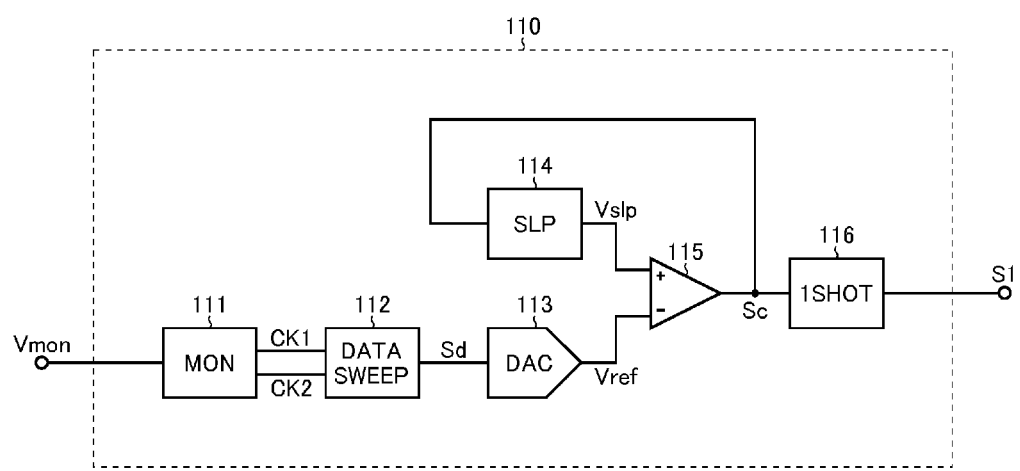
FIG. 3 is a block diagram showing a structure example of an oscillator.

FIG. 3 is a block diagram showing a structure example of the oscillator 110. The oscillator 110 of this structure example includes an input monitor unit 111, a data sweep unit 112, a D/A converter 113, a slope voltage generator 114, a comparator unit 115, and a one-shot pulse generator 116.

The input monitor unit 111 monitors the monitor voltage Vmon (therefore, the AC input voltage Vin and the pulsating voltage V1) so as to generate reference clock signals CK1 and CK2. The reference clock signals CK1 and CK2 have oscillation frequencies F1 and F2 that are respectively m times and n times an input frequency Fac of the monitor voltage Vmon. For instance, when Fac is 100 Hz (=50 Hz×2), m is 20, and n is 1.25, then F1 is 2 kHz and F2 is 125 Hz. A structure and an operation of the input monitor unit 111 will be described later in detail.

The data sweep unit 112 periodically sweeps a data value of a digital signal Sd in synchronization with the reference clock signals CK1 and CK2. More specifically, in accordance with the example described above, the data sweep unit 112 changes the data value of the digital signal Sd every period T1 (=1/F1=0.5 ms) in synchronization with the reference clock signal CK1 in a sequential manner within a range from −4 to +4.

For instance, supposing that an initial data value of the digital signal Sd is −4, the data sweep unit 112 changes the data value of the digital signal Sd every period T1 in an order of −4, −3, −2, −1, ±0, +1, +2, +3, +4, +3, +2, +1, ±0, −1, −2, and −3. In this way, the data value of the digital signal Sd circulates for 8 ms (=period T1×16 steps).

Note that the data sweep unit 112 resets the digital signal Sd to the initial data value (e.g., −4) every period T2 (=1/F2=8 ms) in synchronization with the reference clock signal CK2. The period T2 is determined to coincide with the above-mentioned necessary time (=period T1×16 steps) for the data value of the digital signal Sd to circulate in 16 steps. Accordingly, even if a certain deviation occurs in the above-mentioned data sweep process in synchronization with the reference clock signal CK1, the deviation is always canceled every period T2.

The D/A converter 113 converts the digital signal Sd into a reference voltage Vref (analog voltage). A voltage value of the reference voltage Vref is sequentially switched every period T1 within a range from Vref−4 to Vref+4 in accordance with the data value of the digital signal Sd.

The slope voltage generator 114 generates a slope voltage Vslp having a triangular waveform or a sawtooth waveform in synchronization with a comparison signal Sc. More specifically, the slope voltage Vslp increases at a constant rate during a low level period of the comparison signal Sc and is reset to zero during a high level period of the comparison signal Sc.

The comparator unit 115 compares the reference voltage Vref input to an inverting input terminal (−) with the slope voltage Vslp input to a non-inverting input terminal (+) so as to generate the comparison signal Sc. The comparison signal Sc becomes high level when the slope voltage Vslp is higher than the reference voltage Vref and becomes low level when the slope voltage Vslp is lower than the reference voltage Vref.

The one-shot pulse generator 116 generates a one-shot pulse in the ON signal S1 by a trigger of the rising edge of the comparison signal Sc. In other words, the one-shot pulse generator 116 generates the one-shot pulse in the ON signal S1 every time when the slope voltage Vslp exceeds the reference voltage Vref.

Figure 4:
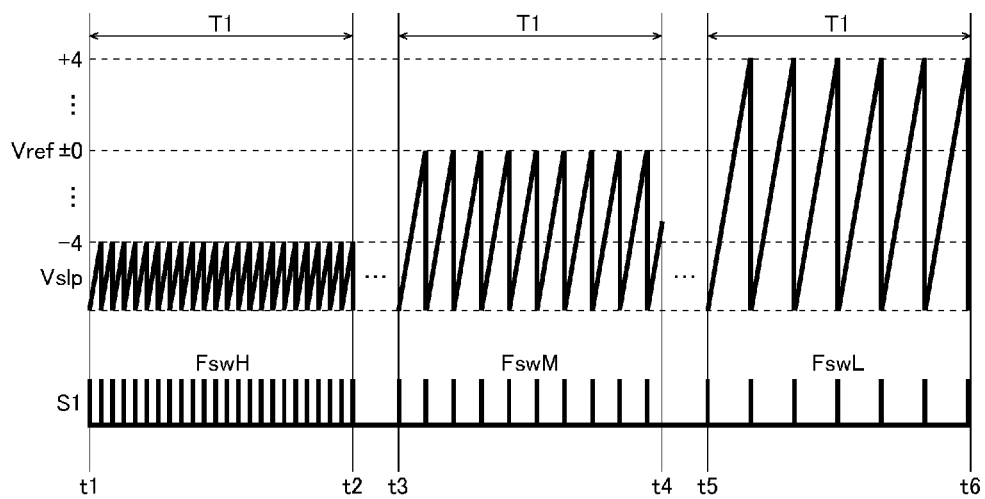
FIG. 4 is a timing chart showing an operation example of the oscillator.

FIG. 4 is a timing chart showing an operation example of the oscillator 110, in which the reference voltage Vref, the slope voltage Vslp, and the ON signal S1 are shown in this order from the upper side.

As shown in the period from time point t1 to time point t2, when the reference voltage Vref is set to a minimum value Vref−4, the necessary time for the slope voltage Vslp to exceed the reference voltage Vref becomes shortest. This state corresponds to a state where the switching frequency Fsw (oscillation frequency of the ON signal S1) of the output transistor N1 is set to a maximum value FswH (e.g., 69 kHz).

As shown in the period from time point t3 to time point t4, when the reference voltage Vref is set to a standard value Vref±0, the necessary time for the slope voltage Vslp to exceed the reference voltage Vref becomes standard. This state corresponds to a state where the switching frequency Fsw (oscillation frequency of the ON signal S1) of the output transistor N1 is set to a standard value FswM (e.g., 65 kHz).

As shown in the period from time point t5 to time point t6, when the reference voltage Vref is set to a maximum value Vref+4, the necessary time for the slope voltage Vslp to exceed the reference voltage Vref becomes longest. This state corresponds to a state where the switching frequency Fsw (oscillation frequency of the ON signal S1) of the output transistor N1 is set to a minimum value FswL (e.g., 61 kHz).

Further, although not illustrated in this figure, if the reference voltage Vref is increased step by step from the minimum value Vref−4 to the standard value Vref±0 during the period from time point t2 to time point t3, the switching frequency Fsw (oscillation frequency of the ON signal S1) of the output transistor N1 is decreased step by step from the maximum value FswH to the standard value FswM. In the same manner, if the reference voltage Vref is increased step by step from the standard value Vref±0 to the maximum value Vref+4 during the period from t4 to time point t5, the switching frequency Fsw (oscillation frequency of the ON signal S1) of the output transistor N1 is decreased step by step from the standard value FswM to the minimum value FswL.

On the contrary to the above description, if the reference voltage Vref is decreased step by step from the maximum value Vref+4 to the minimum value Vref−4, the switching frequency Fsw (oscillation frequency of the ON signal S1) of the output transistor N1 is increased step by step from the minimum value FswL to the maximum value FswH.

<Frequency Hopping Function>

Figure 5:
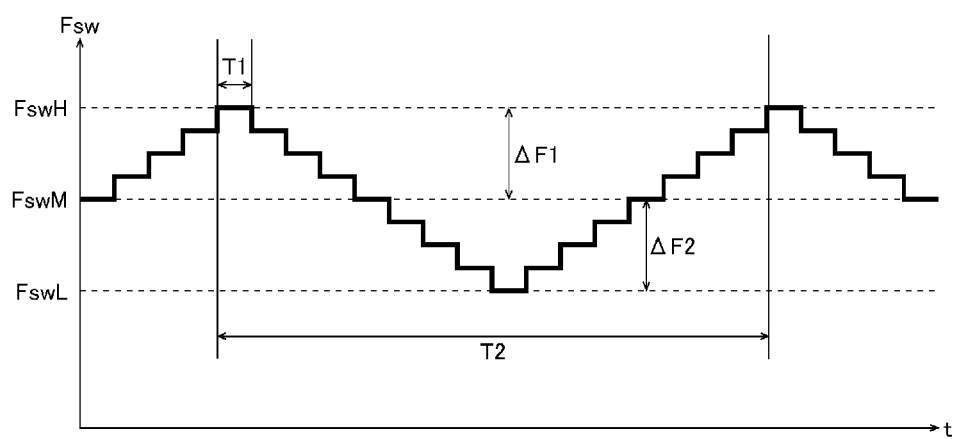
FIG. 5 is a timing chart showing an example of a frequency hopping operation.

FIG. 5 is a timing chart showing an example of the frequency hopping operation (temporal variation of the switching frequency Fsw). As shown in this figure, the switching frequency Fsw is sequentially switched every period T1 within a range from FswL to FswH by the operation of the oscillator 110 described above.

For instance, when the initial frequency of the switching frequency Fsw is the maximum value FswH, the switching frequency Fsw is decreased step by step every period T1 from the maximum value FswH via the standard value FswM to the minimum value FswL, and is then increased step by step to the maximum value FswH. In this case, the switching frequency Fsw circulates for the period T2 (=period T1×16 steps).

Because the frequency spectrum of the ON signal S1 can be spread by the frequency hopping operation described above, it is possible to suppress a noise terminal voltage (conductive noise) so as to realize low EMI. However, in the switching power supply circuit 13 having both the power factor improvement function and the frequency hopping function, if the frequency hopping operation is performed asynchronously with the AC input voltage Vin, even order harmonic characteristics are deteriorated. Hereinafter, a mechanism thereof is described in detail.

<Generation Mechanism of Harmonic Waves>

Figure 6:
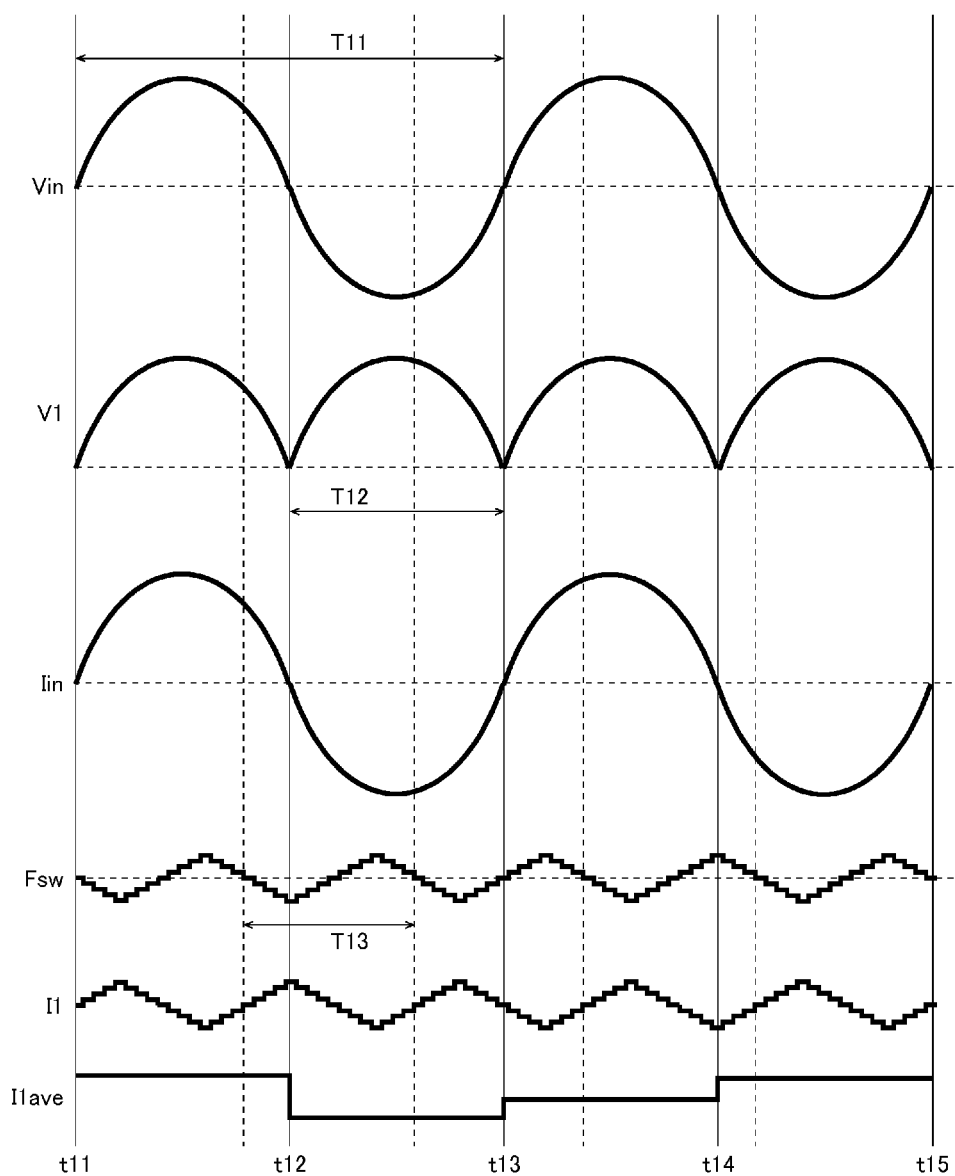
FIG. 6 is a timing chart for explaining a generation mechanism of a harmonic wave.

FIG. 6 is a timing chart for explaining a generation mechanism of harmonic waves, in which the AC input voltage Vin, the pulsating voltage V1, the AC input current Iin, the switching frequency Fsw, input current I1 to the switching power supply circuit 13, and average input current I1ave are shown in this order from the upper side. In this figure, an AC power supply period of the AC input voltage Vin and the AC input current Iin is denoted by T11, a pulsating period of the pulsating voltage V1 is denoted by T12, and a hopping period of the switching frequency Fsw is denoted by T13.

The harmonic waves are components of a periodical complex wave except for a fundamental wave. In particular, an n-th harmonic wave is a harmonic wave having a frequency of n times a fundamental frequency. Note that the complex wave containing harmonic waves has a waveform with distortion.

As described above, in the switching power supply circuit 13 having the frequency hopping function, the switching frequency Fsw of the output transistor N1 is periodically changed. Accordingly, the input current I1 flowing in the coil L1 is periodically changed, and hence an input power Pin ($=(\frac{1}{2}) \times L1 \times I1 \times I1 \times Fsw$) is periodically changed.

Here, if the AC power supply frequency (50 Hz or 60 Hz) and the hopping frequency (e.g., 125 Hz) are not synchronized with each other, a waveform of the input current I1 during the half period on the positive side of the AC input voltage Vin (e.g., during the period from time point t11 to time point t12) and a waveform of the input current I1 during the half period on the negative side of the same (e.g., during the period from time point t12 to time point t13) do not coincide with each other (or are asymmetric in right and left). As a result, the average input current I1ave of every half period of the AC input voltage Vin is periodically changed, which causes even order harmonic waves.

Further, if the frequency hopping function is not provided, the input current I1 depends on the AC input voltage Vin. Accordingly, a waveform of the input current I1 during the half period on the positive side of the AC input voltage Vin and a waveform of the input current I1 during the half period on the negative side of the same coincide with each other (or are symmetric in right and left). Accordingly, the average input current I1ave is not periodically changed, and hence the even order harmonic waves do not cause the problem.

However, in recent years, the LED lighting equipment 1 is required to achieve both the power factor improvement and the low EMI. Accordingly, it is necessary to have both the power factor improvement function and the frequency hopping function, and to effectively suppress occurrence of the even order harmonic waves.

In order to satisfy this requirement, in the switching power supply circuit 13 of this structure example, the oscillator 110 is equipped with the input monitor unit 111, and the frequency hopping operation is performed in synchronization with the AC input voltage Vin. Hereinafter, a structure and an operation of the input monitor unit 111 are described in detail.

<Input Monitor Unit (First Structure Example)>

Figure 7:
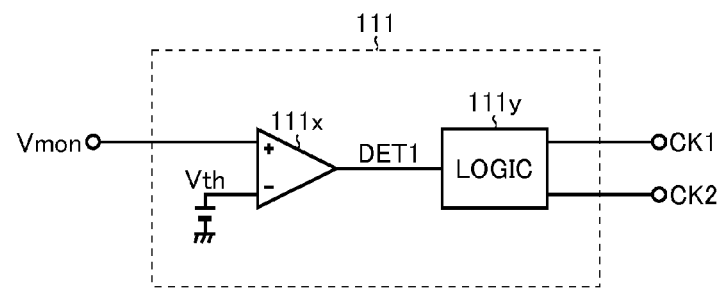
FIG. 7 is a block diagram showing a first structure example of an input monitor unit.

FIG. 7 is a block diagram showing a first structure example of the input monitor unit 111. The input monitor unit 111 of this structure example includes a comparator 111x and a logic unit 111y.

The comparator 111x compares the monitor voltage Vmon input to the non-inverting input terminal (+) with a predetermined threshold voltage Vth input to the inverting input terminal (−) so as to generate a first detection signal DET1. The first detection signal DET1 becomes high level when the monitor voltage Vmon is higher than the threshold voltage Vth, and becomes low level when the monitor voltage Vmon is lower than the threshold voltage Vth.

The logic unit 111y generates the reference clock signals CK1 and CK2 in accordance with the first detection signal DET1. More specifically, the logic unit 111y multiplies the first detection signal DET1 by m (e.g., m=20) so as to generate the reference clock signal CK1, and multiplies the first detection signal DET1 by n (e.g., n=1.25) so as to generate the reference clock signal CK2. Accordingly, the reference clock signals CK1 and CK2 become pulse signals in synchronization with the first detection signal DET1 (therefore, with the monitor voltage Vmon).

Note that the comparator 111x may be turned on and off as necessary. For instance, the comparator 111x should be turned on to be an operating state when the LED lighting equipment 1 is powered on, and the comparator 111x should be turned off to be a non-operating state after frequencies of the reference clock signals CK1 and CK2 are determined. This on/off control enables to reduce power consumption of the comparator 111x. In addition, it is possible to regularly turn on the comparator 111x to be the operating state so as to update the frequencies of the reference clock signals CK1 and CK2.

<Synchronization Between AC Power Supply Frequency and Hopping Frequency>

Figure 8:
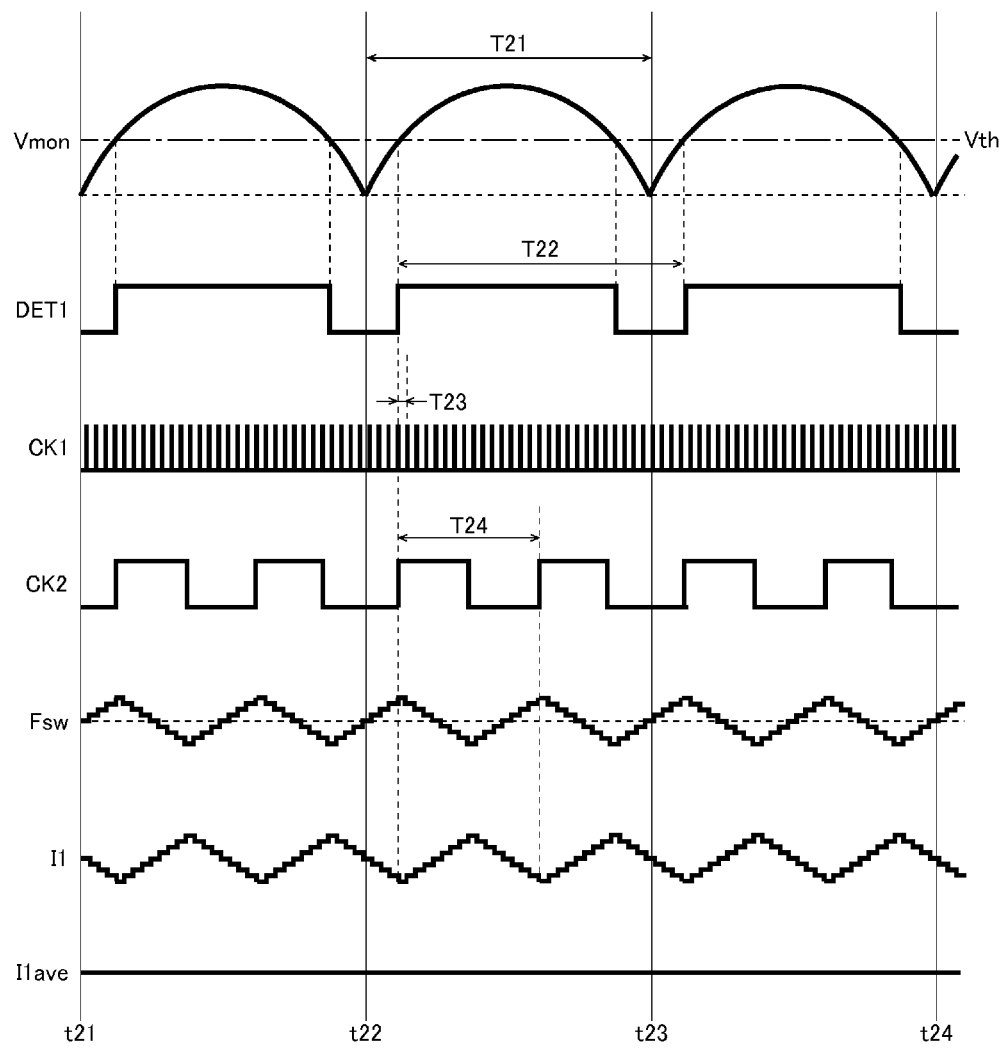
FIG. 8 is a timing chart showing a synchronization operation of an AC power supply frequency and a hopping frequency.

FIG. 8 is a timing chart for explaining a synchronization operation between the AC power supply frequency and the hopping frequency, in which the monitor voltage Vmon, the first detection signal DET1, the reference clock signals CK1 and CK2, the switching frequency Fsw, the input current I1, and the average input current I1ave are shown in this order from the upper side. In this figure, a period of the monitor voltage Vmon is denoted by T21, a period of the first detection signal DET1 is denoted by T22, and periods of the reference clock signals CK1 and CK2 are denoted by T23 and T24, respectively.

The reference clock signals CK1 and CK2 are generated by multiplying the first detection signal DET1 by m and n, respectively (m=32 and n=2 in this figure), and hence become pulse signals in synchronization with the first detection signal DET1 (therefore, with the monitor voltage Vmon).

In this way, the synchronization operation between the AC power supply frequency and the hopping frequency is performed, and hence the waveform of the input current I1 during the half period on the positive side of the AC input voltage Vin (e.g., during the period from time point t21 to time point t22) and the waveform of the input current I1 during the half period on the negative side of the same (e.g., during the period from time point t22 to time point t23) coincide with each other. Accordingly, the average input current I1ave is not periodically changed, and hence it is possible to achieve both the power factor improvement function and the frequency hopping function without deteriorating the even order harmonic characteristics.

<Problem of Input Monitoring Operation>

Figure 9:
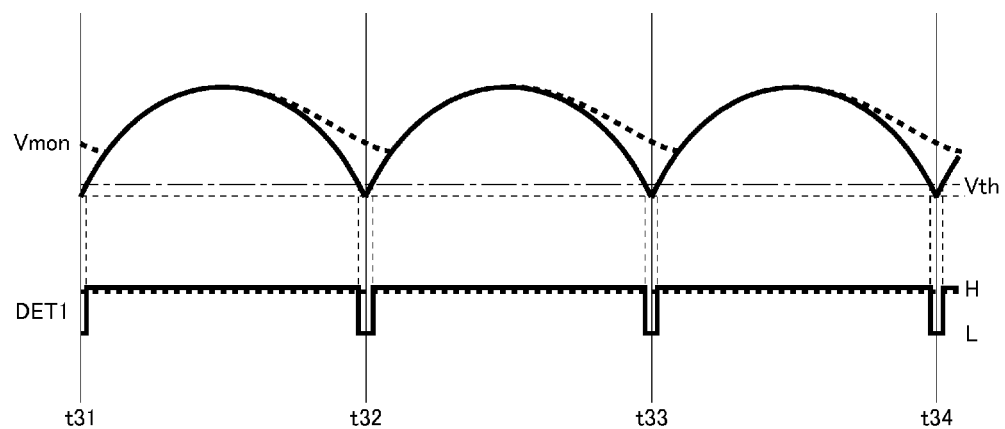
FIG. 9 is a timing chart showing a problem of input monitoring operation.

FIG. 9 is a timing chart showing a problem of the input monitoring operation, in which the monitor voltage Vmon and the first detection signal DET1 are shown in this order from the upper side.

As the threshold voltage Vth is closer to zero, the rising edge of the first detection signal DET1 occurs at a timing closer to a zero cross point of the monitor voltage Vmon, and hence the hopping period T24 in FIG. 8 can be started from a vicinity of the zero cross point of the monitor voltage Vmon.

However, when the load is light, the monitor voltage Vmon is not below the threshold voltage Vth as shown by a broken line in the figure, and the first detection signal DET1 may be fixed to high level. Hereinafter, a structure and an operation of the input monitor unit 111 that can solve the above-mentioned problem are described in detail.

<Input Monitor Unit (Second Structure Example)>

Figure 10:
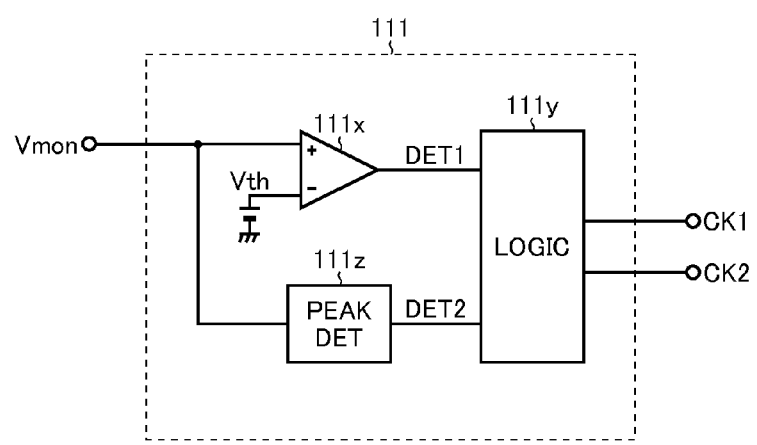
FIG. 10 is a block diagram showing a second structure example of the input monitor unit.

FIG. 10 is a block diagram showing a second structure example of the input monitor unit 111. The input monitor unit 111 of this structure example has a feature that a peak detector 111z is further added to the first structure example (FIG. 7) described above as a base. Accordingly, the same structural element as in the first structure example is denoted by the same reference numeral as in FIG. 7 so that overlapping description thereof is omitted. Hereinafter, the peak detector 111z as a feature of the second structure example is mainly described.

The peak detector 111z detects a peak timing (maximum timing) of the monitor voltage Vmon so as to generate a second detection signal DET2. More specifically, the peak detector 111z generates a one-shot pulse in the second detection signal DET2 at time point when detecting a peak (maximum point) of the monitor voltage Vmon.

The logic unit 111y generates the reference clock signals CK1 and CK2 in accordance with the first detection signal DET1 and the second detection signal DET2. More specifically, if a pulse edge is generated in the first detection signal DET1, the reference clock signals CK1 and CK2 are generated by multiplying the first detection signal DET1 by m and n, respectively, as described above. On the other hand, if the first detection signal DET1 is fixed to the high level, zero cross points and the period of the monitor voltage Vmon are calculated from a one-shot pulse interval of the second detection signal DET2, and the reference clock signals CK1 and CK2 are generated in accordance with the calculation result.

<Improvement of Input Monitoring Operation>

Figure 11:
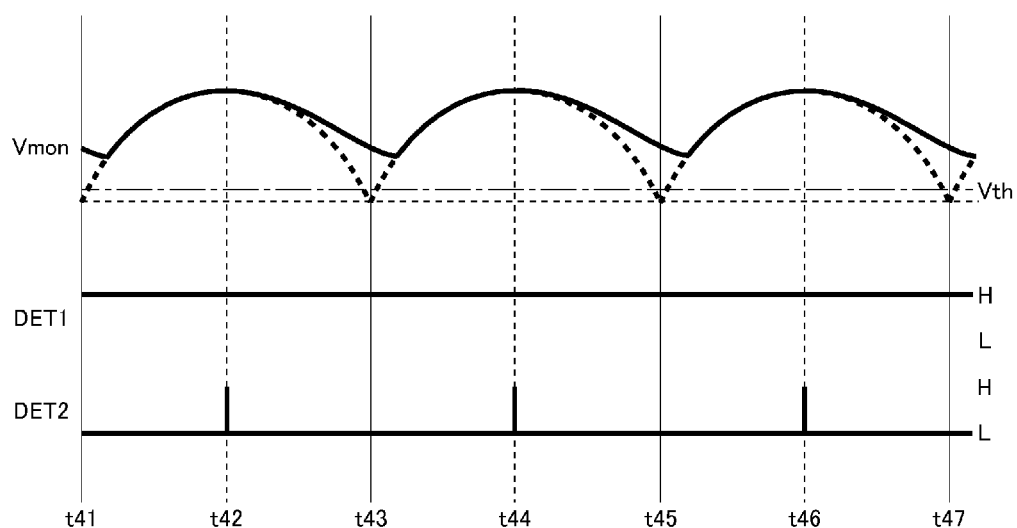
FIG. 11 is a timing chart showing an improvement of the input monitoring operation.

FIG. 11 is a timing chart showing improvement of the input monitoring operation, in which the monitor voltage Vmon, the first detection signal DET1, and the second detection signal DET2 are shown in this order from the upper side. As shown in this figure, when the load is light, even if the monitor voltage Vmon is not below the threshold voltage Vth, the one-shot pulse of the second detection signal DET2 is generated by detecting the peak timing of the monitor voltage Vmon. Accordingly, the synchronization operation between the AC power supply frequency and the hopping frequency can be appropriately performed even if the load is light.

<Specific Application Example of LED Lighting Equipment>

Figure 12A:
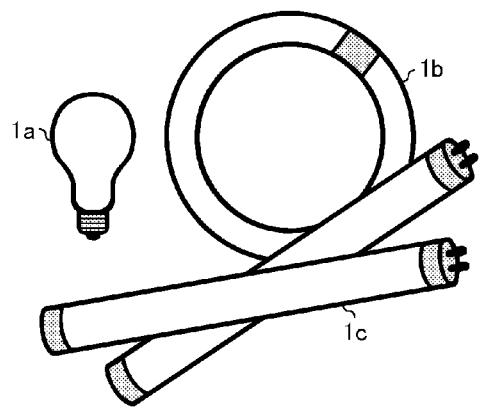
FIG. 12A is an external view showing a first application example of LED lighting equipment 1.
Figure 12B:
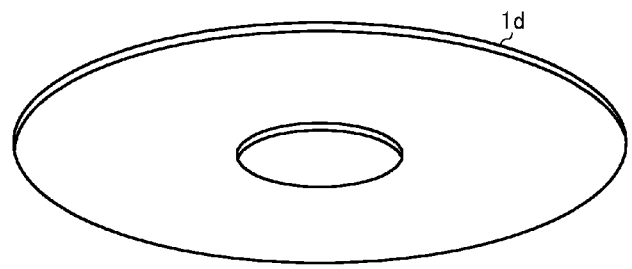
FIG. 12B is an external view showing a second application example of the LED lighting equipment 1.
Figure 12C:
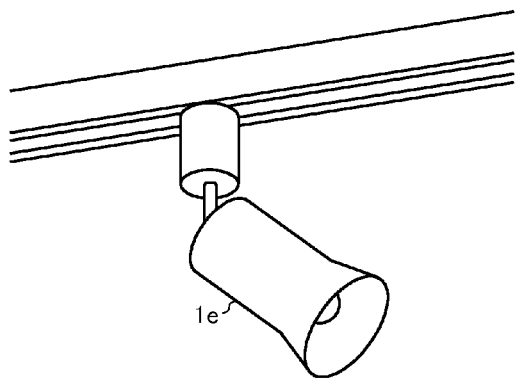
FIG. 12C is an external view showing a third application example of the LED lighting equipment 1.

FIGS. 12A to 12C are external views respectively showing first to third application examples of the LED lighting equipment 1. FIG. 12A shows a bulb-type LED lamp 1a, a circular LED lamp 1b, and a straight type LED lamp 1c. In addition, FIG. 12B shows an LED ceiling light 1d, and FIG. 12C shows an LED down light 1e. These are all examples, and the LED lighting equipment 1 can be used in various types and forms.

<Other Variations>

Note that various technical features disclosed in this specification can be variously modified besides the embodiment described above within the scope of the spirit of the technical creation. In other words, the embodiment described above is merely an example in every aspect and should not be interpreted as a limitation. The technical scope of the present invention is defined not by the embodiment described above but by the claims, which should be interpreted to include all modifications belonging to meaning and range equivalent to the claims.

<Industrial Applicability>

The invention disclosed in this specification can be widely applied to electronic equipment supplied with AC power.

What is claimed is:

1. A switching power supply circuit, comprising:
   an output transistor arranged to be turned on and off for generating a desired output voltage from a pulsating voltage obtained by rectifying an AC input voltage;
   an oscillator arranged to generate an ON signal at a switching frequency varying periodically in synchronization with the AC input voltage or the pulsating voltage;
   a controller arranged to generate an OFF signal so that the output voltage is adjusted to a target value while a power factor becomes close to one;
   a logic circuit arranged to generate a switch control signal in accordance with the ON signal and the OFF signal; and
   a driver arranged to turn on and off the output transistor in accordance with the switch control signal,
   wherein the oscillator includes:
      an input monitor unit arranged to monitor one of the AC input voltage, the pulsating voltage and a monitor voltage obtained by dividing the AC input voltage or the pulsating voltage, so as to generate a reference clock signal,
      a data sweep unit arranged to sweep a data value of a digital signal in synchronization with the reference clock signal,
      a digital-to-analog converter arranged to convert the digital signal into an analog voltage,
      a slope voltage generator arranged to generate a slope voltage having a triangular waveform or a sawtooth waveform,
      a comparator unit arranged to compare the analog voltage with the slope voltage so as to generate a comparison signal, and
      a one-shot pulse generator arranged to generate a one-shot pulse in the ON signal in accordance with the comparison signal.

2. The switching power supply circuit according to claim 1, wherein the input monitor unit includes:
   a comparator arranged to compare one of the AC input voltage, the pulsating voltage, and the monitor voltage with a predetermined threshold voltage, so as to generate a first detection signal, and
   a logic unit arranged to generate the reference clock signal in accordance with the first detection signal.

3. The switching power supply circuit according to claim 2, wherein
   the input monitor unit further includes a peak detector arranged to detect a peak timing of one of the AC input voltage, the pulsating voltage, and the monitor voltage, so as to generate a second detection signal, and the logic unit generates the reference clock signal in accordance with the first detection signal and the second detection signal.

4. A power supply module comprising:
a rectifier circuit arranged to rectify an AC input voltage so as to generate a pulsating voltage, and
the switching power supply circuit according to claim 1.

5. The power supply module according to claim 4, further comprising a filter circuit arranged to remove noise components in a pre-stage of the switching power supply circuit.

6. The power supply module according to claim 4, further comprising a DC/DC converter circuit arranged to supply power to a load in a post-stage of the switching power supply circuit.

7. A lighting equipment comprising:
the power supply module according to claim 4, and
a light emitting element supplied with power from the power supply module.

8. The lighting equipment according to claim 7, wherein the light emitting element is one of a light emitting diode (LED) element and an organic electro-luminescence (EL) element.

9. The lighting equipment according to claim 8, wherein the lighting equipment is used as one of a bulb-type lamp, a circular lamp, a straight type lamp, a ceiling light, and a down light.

* * * * *